United States Patent
Foss et al.

(10) Patent No.: US 11,060,893 B2
(45) Date of Patent: Jul. 13, 2021

(54) MAGNETIC FLOWMETER WITH FLOW INDEPENDENT AUTOZERO ESTIMATION

(71) Applicant: Micro Motion Inc., Boulder, CO (US)

(72) Inventors: Scot R. Foss, Eden Prairie, MN (US); Andrew T. Kline, Eagan, MN (US)

(73) Assignee: Micro Motion Inc., Boulder, CO (US)

( * ) Notice: Subject to any disclaimer, the term of this patent is extended or adjusted under 35 U.S.C. 154(b) by 132 days.

(21) Appl. No.: 16/570,328

(22) Filed: Sep. 13, 2019

(65) Prior Publication Data
US 2021/0080301 A1 Mar. 18, 2021

(51) Int. Cl.
G01F 1/60 (2006.01)
G01F 1/58 (2006.01)

(52) U.S. Cl.
CPC ................. *G01F 1/60* (2013.01)

(58) Field of Classification Search
None
See application file for complete search history.

(56) References Cited

U.S. PATENT DOCUMENTS

| | | | | |
|---|---|---|---|---|
| 5,905,206 | A * | 5/1999 | Herwig | G01F 1/60 73/861.12 |
| 6,752,026 | B1 * | 6/2004 | Hyde | G01F 1/586 73/861.15 |
| 9,429,454 | B2 | 8/2016 | Gao et al. | |

| | | | |
|---|---|---|---|
| 2002/0117009 | A1 | 8/2002 | Keech |
| 2005/0075803 | A1 | 4/2005 | Budmiger et al. |
| 2013/0006544 | A1 | 1/2013 | Rovner |

OTHER PUBLICATIONS

International Search Report and Written Opinion for International Patent Application No. PCT/US2020/049432, dated Dec. 17, 2020, 9 pages.

(Continued)

*Primary Examiner* — Harshad R Patel
(74) *Attorney, Agent, or Firm* — Christopher R. Christenson; Kelly, Holt & Christenson PLLC

(57) ABSTRACT

A magnetic flowmeter includes at least one coil configured to generate a magnetic field within a process fluid flow. A pair of electrodes is configured to detect an electromotive force within the process fluid flow in response to the magnetic field. Coil drive circuitry is coupled to the at least one coil and is configured to cause the at least one coil to generate the magnetic field. Measurement circuitry is operably coupled to the pair of electrodes and configured to provide an indication of the detected electromotive force. A processor is coupled to the measurement circuitry and the coil drive circuitry. The processor is configured to cause the coil drive circuitry to operate at one of a plurality of coil drive frequencies. The processor is also configured to obtain a plurality of measurement samples while process fluid is flowing and while the coil drive circuitry is operating at a first frequency. The processor is configured to generate an autozero estimate for operation at a second coil drive frequency higher than the first coil drive frequency and to save the autozero estimate for use during operation at the second coil drive frequency.

22 Claims, 5 Drawing Sheets

(56) References Cited

OTHER PUBLICATIONS

International Search Report and Written Opinion for International Patent Application No. PCT/US2020/049877, dated Dec. 15, 2020, 14 pages.
International Search Report and Written Opinion for International Patent Application No. PCT/US2020/049159, dated Dec. 8, 2020, 10 pages.
"High Process Noise Field Guide" retrieved from https://www.emerson.com/documents/automation/white-paper-high-process-noise-field-guide-rosemount-en-89368.pdf, Emerson Process Management. 2012, 4 pages.
U.S. Appl. No. 16/570,322, filed Sep. 13, 2019, Application and Drawings, 26 pages.
U.S. Appl. No. 16/570,301, filed Sep. 13, 2019, Application and Drawings, 19 pages.

* cited by examiner

MAGNETIC FLOWMETER WITH FLOW INDEPENDENT AUTOZERO ESTIMATION

BACKGROUND

Magnetic flowmeters (or magmeters) measure flow by application of Faraday's Law, an electromagnetic effect. The magnetic flowmeter energizes one or more coils by passing an excitation current through field windings which generates a magnetic field across an electrically isolated, conductive process fluid flow. An electromotive force (EMF) is generated by the flowing process fluid crossing through the magnetic field. This induced voltage (potential) both across the fluid and with respect to the rest of the process fluid can readily be measured by one or more conductive electrodes that contact the flowing process fluid. The volumetric flow is proportional to the flow velocity and the cross-sectional area of the flowtube. The flow velocity is directly proportional to the electrode voltage potential (EV), which is directly proportional to the induced magnetic field strength (B). The induced magnetic field strength is assumed to be proportional to the applied magnetic field (H), which is directly linked to the magnitude of the excitation current. Thus, a direct correlation is provided between the measured electrode voltage potential and indicated volumetric flow.

Magnetic flowmeters are useful in a variety of conductive and semi-conductive fluid flow measurement environments. In particular, the flow of water-based fluids, ionic solutions and other conducting fluids can all be measured using magnetic flowmeters. Thus, magnetic flowmeters can be found in water treatment facilities, beverage and hygienic food production, chemical processing, high purity pharmaceutical manufacturing, as well as hazardous and coercive processing facilities. However, some environments are more susceptible to signal noise. Providing an electromagnetic flowmeter with a better response to signal noise would improve the accuracy of the flow output when used in such noisy environments.

SUMMARY

A magnetic flowmeter includes at least one coil configured to generate a magnetic field within a process fluid flow. A pair of electrodes is configured to detect an electromotive force within the process fluid flow in response to the magnetic field. Coil drive circuitry is coupled to the at least one coil and is configured to cause at least one coil to generate the magnetic field. Measurement circuitry is operably coupled to the pair of electrodes and configured to provide an indication of the detected electromotive force. A processor is coupled to the measurement circuitry and the coil drive circuitry. The processor is configured to cause the coil drive circuitry to operate at one of a plurality of coil drive frequencies. The processor is also configured to obtain a plurality of measurement samples while process fluid is flowing and while the coil drive circuitry is operating at a first frequency. The processor is configured to generate an autozero estimate for operation at a second coil drive frequency higher than the first coil drive frequency and to save the autozero estimate for use during operation at the second coil drive frequency.

DETAILED DESCRIPTION OF ILLUSTRATIVE EMBODIMENTS

Figure 1:
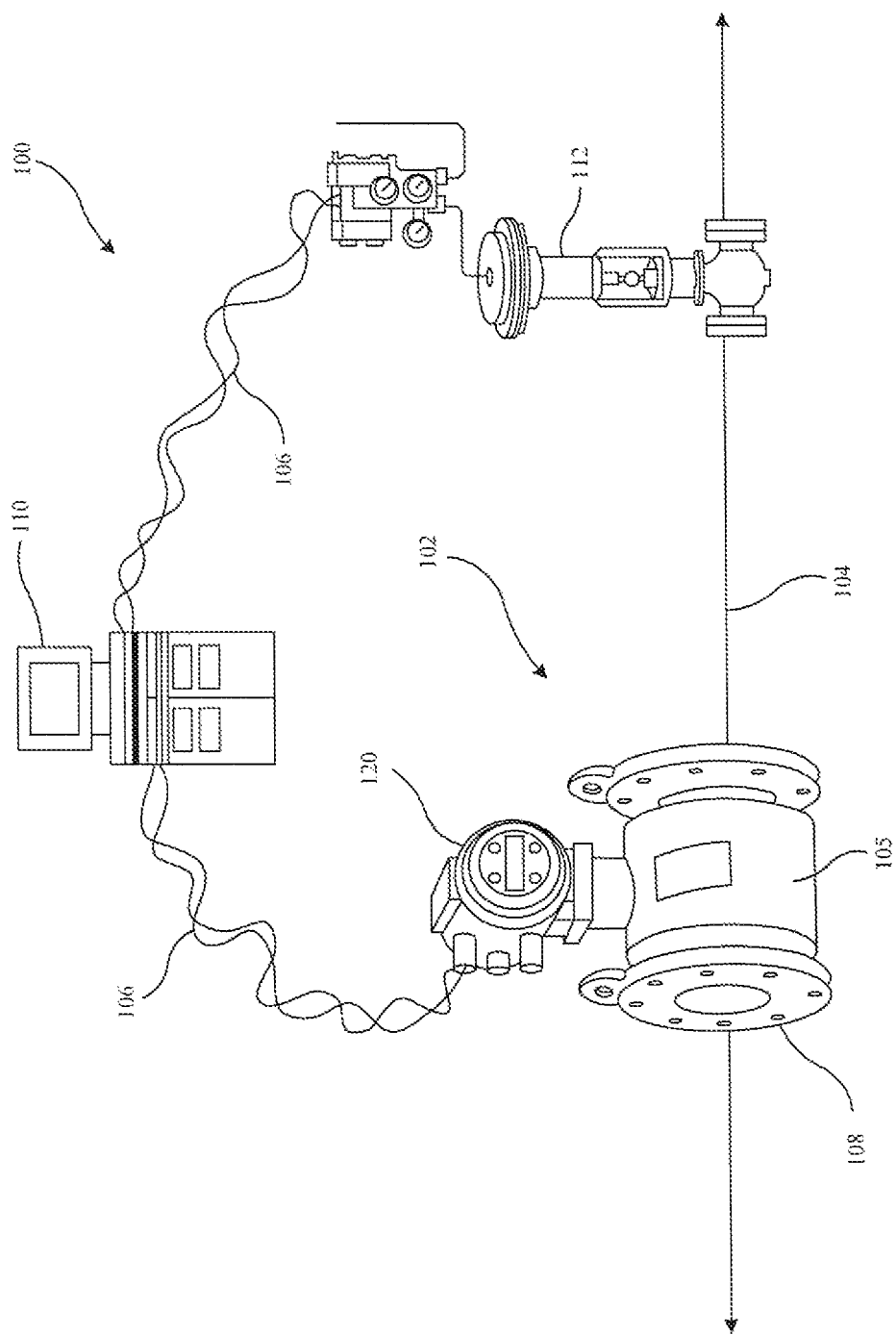
FIG. 1 is a diagrammatic view of an environment in which magnetic flowmeters in accordance with embodiments of the present invention are useful.

FIG. 1 illustrates a typical environment 100 for magnetic flowmeter 102. Magnetic flowmeter 102 is coupled to process piping, illustrated diagrammatically at line 104 that also couples to control valve 112. Magnetic flowmeter 102 is configured to provide a flow rate output relative to process fluid flow through piping 104 in a process. Examples of such fluids include slurries and liquids in chemical, pulp, pharmaceutical and other fluid processing plants.

Magnetic flowmeter 102 includes electronics housing 120 connected to flowtube 108. Magnetic flowmeter 102 outputs are configured for transmission over relatively long distances to a controller or indicator via process communication connection 106. In typical processing plants, communication connection 106 can be either a digital communication protocol or an analog communication signal. The same or additional process information can be made available via wireless communication, pulse width or frequency output, or discrete input/outputs (DI/DO). System controller 110 can display flow information for a human operator as well as provide control signals over process communication connection 106 in order to control the process using control valves, such as valve 112.

Figure 2:
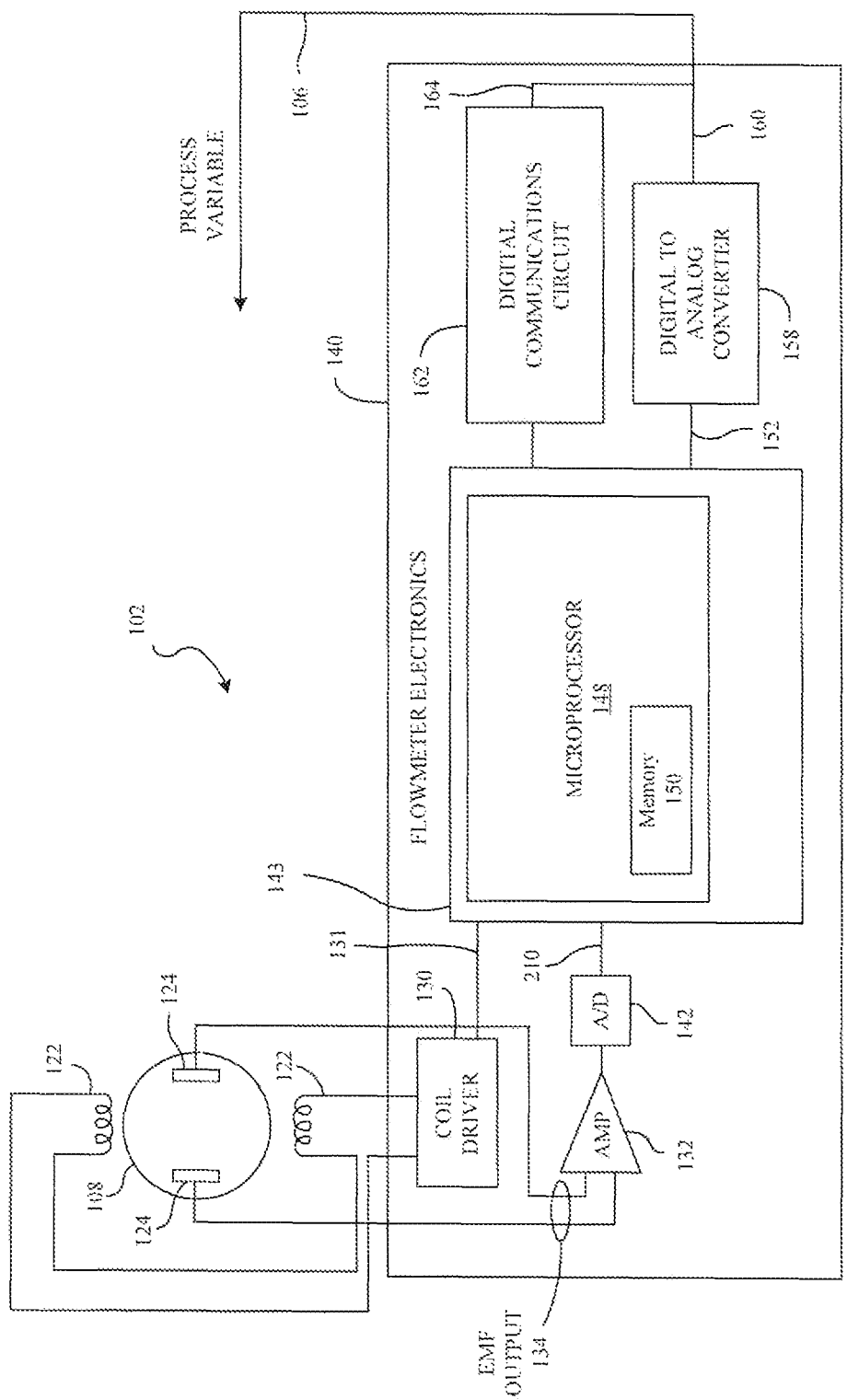
FIG. 2 is a block diagram of a magnetic flowmeter in accordance with an embodiment of the present invention.

FIG. 2 is a block diagram of a magnetic flowmeter with which embodiments of the present invention are particularly applicable. Magnetic flowmeter 102 measures a flow of conductive process fluid through flowtube assembly 108. Coils 122 are configured to apply an external magnetic field to the fluid flow in response to an applied excitation current from coil driver 130. EMF sensors (electrodes) 124 electrically couple to the fluid flow and provide an EMF signal output 134 to amplifier 132 related to an EMF generated in the fluid flow due to the applied magnetic field, fluid velocity, and noise. Analog-to-digital converter 142 provides a digitized EMF signal 210 to microprocessor system 148 of flowmeter electronics 143. Microprocessor 148 may be configured, through hardware, software, or a combination thereof, to provide digital signal processing functions relative to EMF output 134 in order to provide an output 152 related to fluid velocity. Microprocessor 148 produces control outputs 131 to coil driver circuit 130 to operate at one of a plurality of different operating frequencies. In one embodiment, the plurality of different operating frequencies includes a low frequency and a high frequency, where the high frequency is higher than the low frequency. Memory 150 contains programming instructions to control the operation 148. Further, as will be described in greater detail below, the signal processing can provide improved noise rejection.

Microprocessor 148 calculates fluid flow velocity through flowtube 108 in accordance with a relationship between the EMF output 134 and flow velocity as described in an application of Faraday's Law:

$$V = \frac{E}{kBD} \qquad \text{Equation 1}$$

Where E can be the signal output 152 which is related to the EMF output 134, V is the velocity of the fluid, D is the diameter of flowtube 108, B is the strength of the induced magnetic field in the process fluid, and k is a constant of proportionality. A digital-to-analog converter 158 is coupled to microprocessor 148 of flowmeter electronics 143 and, in some embodiments, may generate an analog transmitter output 160 for coupling to communication bus 106. A digital communication circuit 162 may generate a digital transmitter output 164. The analog output 160 and/or digital output 164 can be coupled to process controllers or monitors, as desired.

Many magnetic flowmeter applications have a significant level of 1/f or pink noise. One way to improve the signal to noise ratio in such instances is to increase the coil drive frequency. Typically, doubling the coil drive frequency will double the signal to noise ratio. However, high coil drive frequencies can also have issues with offsets in the flow caused by the changing magnetic field and the electrode circuitry. Typically, an autozero trim is performed while the flow conduit has a zero flow condition in order to generate a trim that corrects the offset. One difficulty is that many operations cannot simply stop the process fluid flow in order to perform an autozero operation with a zero flow condition.

In accordance with embodiments described below, a magnetic flowmeter is provided that can perform an estimated autozero function without requiring a zero flow condition in the flow tube. This is helpful because it is often difficult for operators to shut down the processes to perform an autozero trim operation with zero flow. The purpose of performing an autozero trim is to remove high coil frequency offset created by parasitic interactions between the magnetic field and the electrode measurement circuit. Often times operators are forced to wait months for a scheduled shutdown in order to perform such autozero trim operations. Thus, operators are often forced to make a difficult choice between continuing to run with noisy flow or switching to high frequency coil operation and having an offset error that could be quite significant.

Embodiments provided herein generally provide an estimate of a high frequency autozero offset while running at a low coil frequency while flow is still moving through the flow conduit. While running at the lower coil frequency, the magnetic flowmeter will also measure the electrode signal at the high frequency measurement locations. This then provides enough information to solve for the high frequency autozero offset. This can be a commanded trim routine that will store the offset in memory and allow the magnetic flowmeter to make the switch over to higher coil drive frequency while still maintaining accuracy and not requiring flow stoppage for an accurate autozero trim parameter. Switching to the higher coil drive frequency can sometimes provide a significant improvement in noise performance.

Pulsed direct current (DC) magnetic flowmeters generally measure flow by driving the coils to produce magnetic fields with a square wave. The height of the electrode voltage wave form is generally proportional to the flow velocity. Some magnetic flowmeters, such as that sold under the trade designation 8707Hi-Signal, available from Emerson Automation Solutions, of Eden Prairie, Minn., provides both low and high frequency coil drive abilities. Exemplary low and high frequencies can be 5 and 37.5 Hz, respectively. A range of frequencies can be used, however, including 11 Hz, 18.75 Hz, 55 Hz, and 75 Hz. Typically, 20% of the waveform is averaged to measure the height of the electrode voltage.

Figure 3:
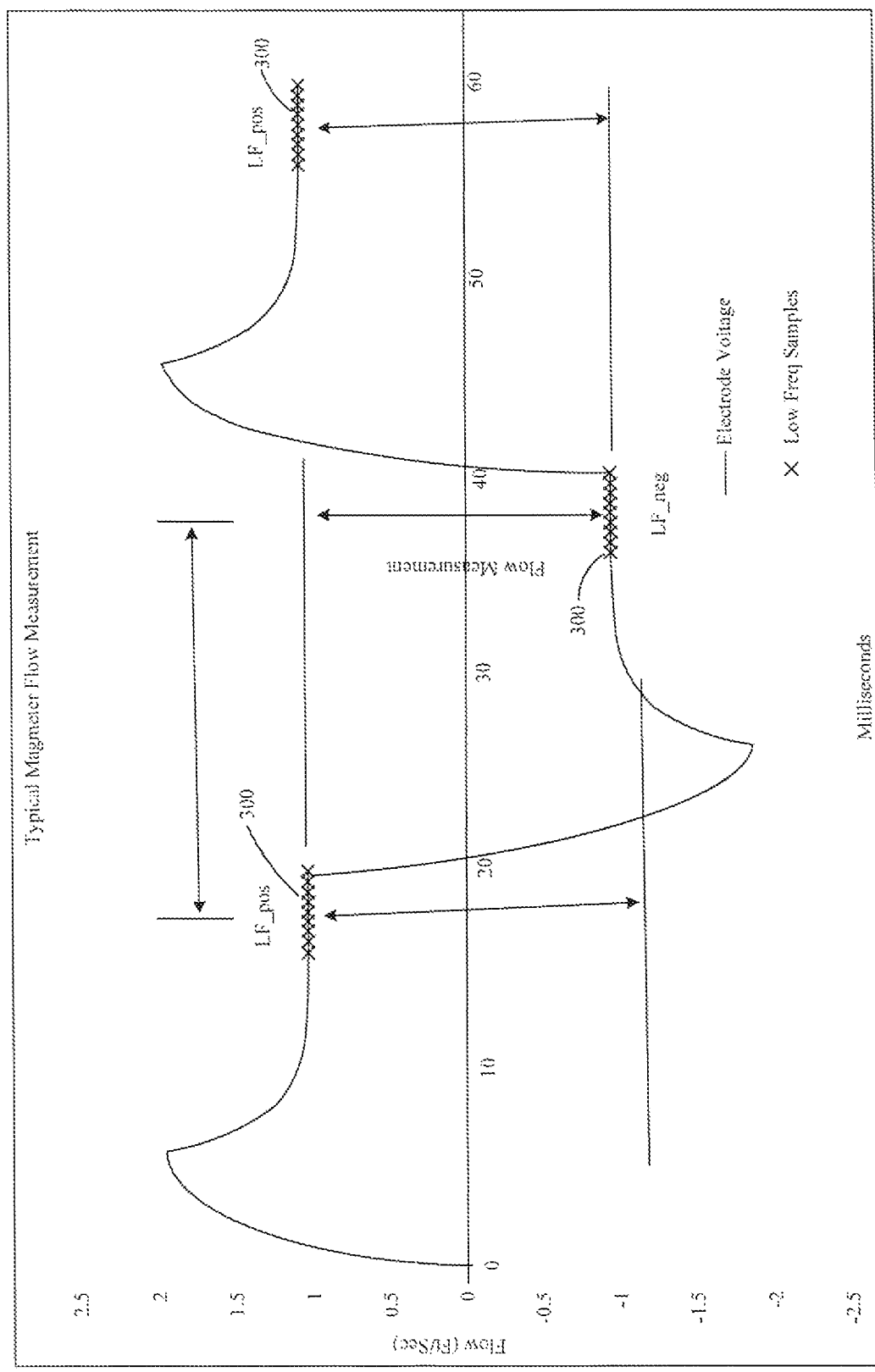
FIG. 3 is a signal chart illustrating when measurements typically occur while driving the coils of a magnetic flowmeter.

FIG. 3 is a signal chart illustrating when measurements typically occur while driving the coils of a magnetic flowmeter. The low frequency measurement positions (i.e. indicating time in milliseconds during the signal) are indicated diagrammatically at reference numerals 300. As can be seen, positions 300, generally occur after the signal has substantially settled to a relatively steady state. This is the portion of the waveform that is used for the low frequency measurements. As can also be seen, the low frequency measurement windows generally have a low frequency-positive window that occurs during a positive polarity voltage, and a low frequency-negative window that occurs during a negative voltage condition.

Embodiments described herein generally leverage the relationship between the offset for low frequency and high frequency operation in order to generate a high frequency offset estimate during low frequency operation. The flow equations for both low and high coil drive frequency options are shown below:

$$\text{Flow}=LF_{gain}*(LF_{pos}-LF_{neg})-LF_{ZeroOffset} \qquad \text{Equation 2}$$

$$\text{Flow}=HF_{gain}*(HF_{pos}-HF_{neg})-HF_{ZeroOffset} \qquad \text{Equation 3}$$

The sensors are designed and calibrated so that the $LF_{ZeroOffset}$ is essentially zero feet/second. Further, $LF_{gain}$ and $HF_{gain}$ are known from sensor calibration numbers that are configured or otherwise obtained during manufacture. Accordingly, the high frequency zero offset can be solved as set forth in the following equation.

$$HF_{ZeroOffset}=HF_{gain}*(HF_{pos}-HF_{neg})-LF_{gain}*(LF_{pos}-LF_{neg})$$

High frequency autozero operations typically require a user to shut down their process to provide a zero flow condition. However, since high frequency zero offset is not affected by the flow rate, it can by heavily filtered and measured over a long period of time (relative to an individual measurement cycle) to handle noise on the electrode signal. In one example, the high frequency samples are measured and averaged over a period of about 90 seconds. The high frequency zero value is then stored in memory 150, and the user can easily change to accurate high frequency operation without generating a zero flow condition. Further, the high frequency autozero operation can occur while the magnetic flowmeter is operating at low frequency and providing process fluid flow measurements.

Figure 4:
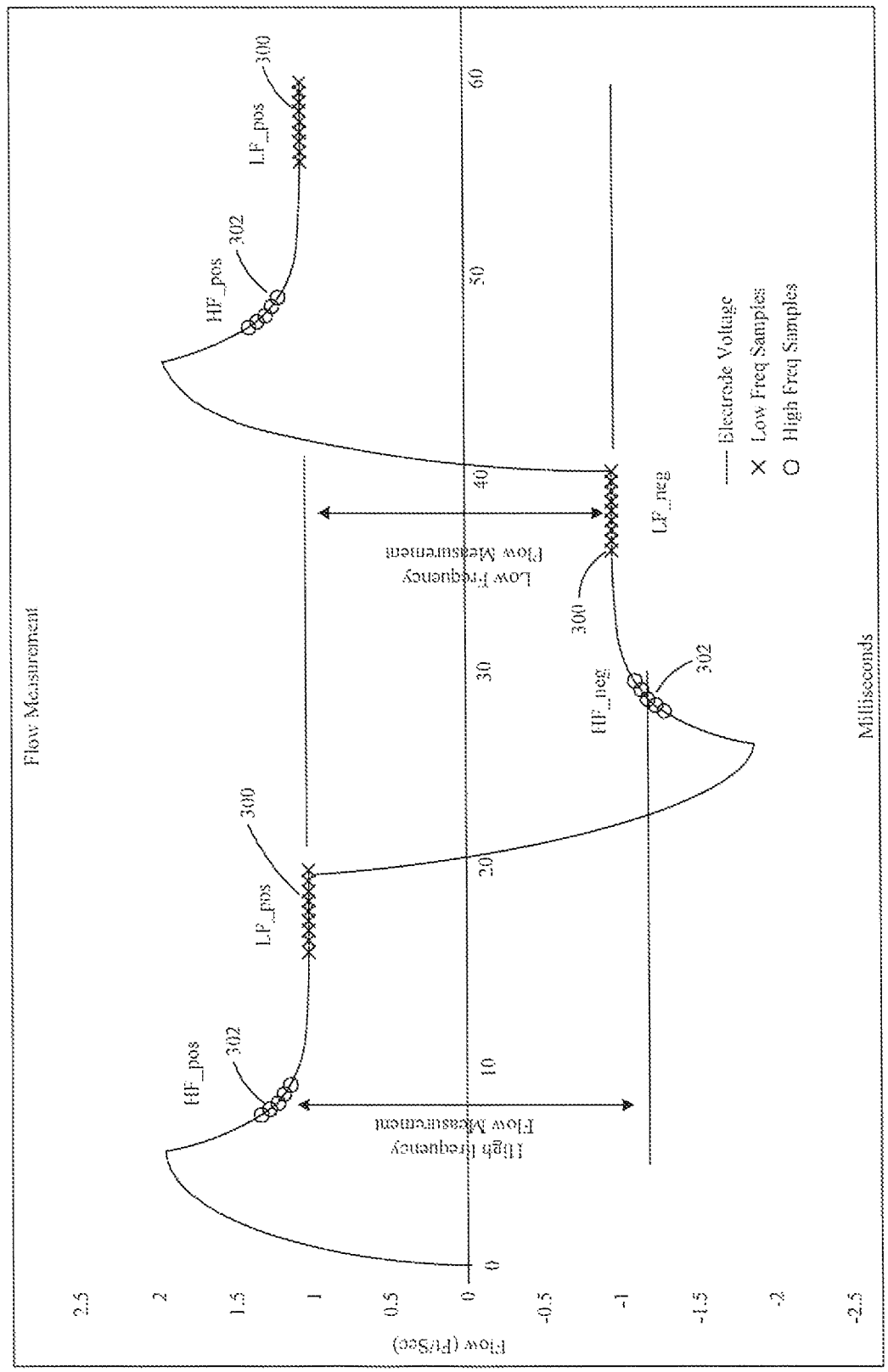
FIG. 4 is a signal chart illustrating when low and high frequency measurements occur in accordance with an embodiment of the present invention.

FIG. 4 illustrates the location of the low and high frequency measurements labeled diagrammatically at reference numerals 300, 302. As illustrated, the high frequency measurements precede the low frequency measurements in each measurement cycle by approximately one quarter of the total measurement period (positive and negative) period. Thus, the high frequency measurement positions 302 occur before the signal has substantially stabilized. While the high frequency measurement positions are fixed, in one embodiment, they could also be moved back towards the transition. Doing so, could help determine how fast the sensor could run (i.e. maximum coil drive frequency) by limiting the autozero value. On some sensors, this could allow operation at twice as fast as the calibrated high frequency and yield a further improvement in noise rejection.

Figure 5:
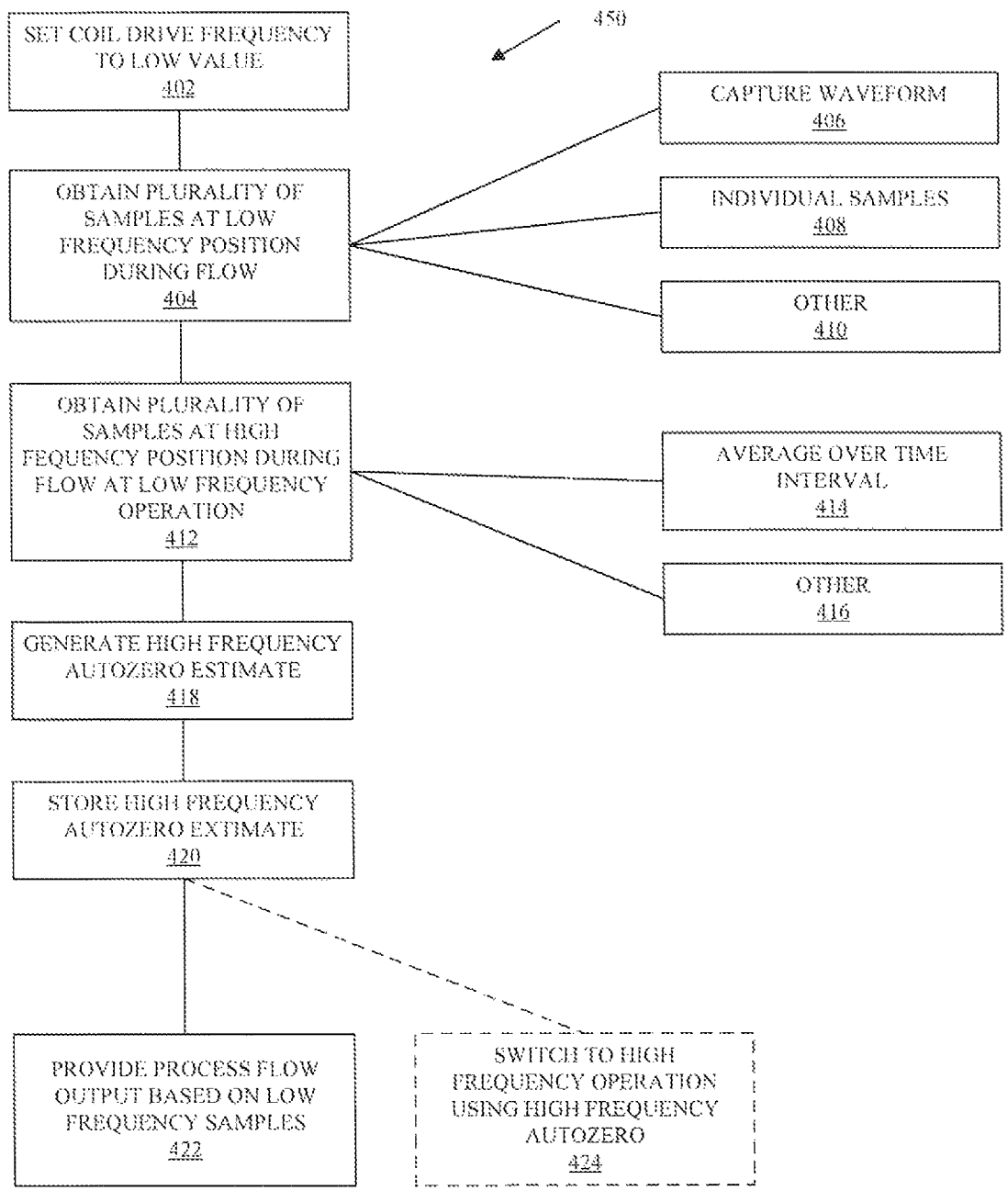
FIG. 5 is a flow diagram of a method of operating a magnetic flowmeter in accordance with an embodiment of the present invention.

FIG. 5 is a flow diagram of a method of operating a magnetic flowmeter in accordance with an embodiment of the present invention. Method 450 begins at block 402 where microprocessor 148, or other suitable circuitry, sets the coil drive circuitry to a low frequency value. In one embodiment, this value is 5 Hz. Then, at block 404, samples are obtained from the detected at a low frequency position of an emf waveform (shown in FIG. 4). The low frequency position, in one embodiment, includes about 20% of the waveform and occurs at a location wherein the waveform has substantially stabilized. The plurality of samples may be obtained by sampling the emf at a plurality of times, as indicated at reference numeral 406, by digitizing the entire waveform and analyzing it to extract the plurality of samples, as indicated at reference numeral 408, or via another suitable technique, as indicated at reference numeral 410.

At block 412, a plurality of high frequency samples are obtained during operation at the low frequency and while process fluid flow is occurring. The samples obtained during block 412 are preferably combined with high frequency samples from other measurement cycles in order to provide a smoothed value or average. In one example, the high frequency samples are averaged over a defined time interval, as indicated at reference numeral 414. One suitable time interval is 90 seconds. When block 418 is complete, an average or combined HF-pos value is provided along with an average or combined HF-neg value is provided. However, other intervals and/or other techniques for combining the various high frequency samples can be used, as indicated at reference numeral 416.

At block 418, the combined HF-pos and HF-neg values are combined with low frequency samples and known gain values for both high and low frequency operation to generate a high frequency zero offset estimation. This estimation can be generated in accordance with the equations set forth above, or using different calculations and/or techniques. At block 420, the high frequency autozero estimate is stored in memory, such as memory 150 to be used for subsequent high frequency operation.

When the autozero estimate has finished, or during execution, the microprocessor may still evaluate the low frequency samples to provide a process flow output at the low coil frequency as indicated at reference numeral 422. Additionally or alternatively, after the high frequency estimation operation is complete, the magnetic flowmeter may transition to high frequency operation and employ the stored high frequency autozero estimation stored in memory, as indicated at reference numeral 424.

While the embodiment described with respect to FIG. 5 has two frequencies (Low/High), it is expressly contemplated that embodiments can be practiced with more than two frequencies. Further, instead of using a low frequency operation to obtain an autozero estimate for high frequency operation, embodiments can also employ a super-low frequency (e.g. half of the low frequency) to obtain an autozero estimate for low frequency operation. Further still, such embodiments may still employ low frequency operation to obtain an autozero estimate for high frequency operation.

Embodiments described herein are not limited to the particular equations set forth above but may use any suitable technique or algorithm that employs low-frequency coil operation to provide or otherwise obtain a value that can estimate high-frequency coil offset. Further, while some particular operating coil frequencies have been disclosed, those skilled in the art will appreciate that embodiments described herein can be practiced with any suitable coil drive frequencies.

As can be appreciated, with the ability to generate autozero estimates without having to stop process fluid flow, the autozero operation can be performed frequently. Moreover, the autozero estimates can be saved and analyzed to detect when there has been a significant change in the autozero values. This can occur due to large changes in conductivity, wiring, or if the sensor was moved to a different transmitter. In such instances, the magnetic flowmeter could warn the user that an autozero should be performed or other suitable corrective action taken.

Although the present invention has been described with reference to preferred embodiments, workers skilled in the art will recognize that changes may be made in form and detail without departing from the spirit and scope of the invention. For example, while embodiments described above generally obtain and save the autozero estimate for use when the magnetic flowmeter switches over to high frequency operation, it is expressly contemplated that embodiments can be used to provide a magnetic flowmeter that continuously alternates between low and high coil drive frequencies to calculate and update the high frequency autozero value. This would essentially give the high frequency performance without requiring any user interaction to engage the autozero estimation operation.

What is claimed is:

1. A magnetic flowmeter, comprising:
at least one coil configured to generate a magnetic field within a process fluid flow;
a pair of electrodes configured to detect an electromotive force within the process fluid flow in response to the magnetic field;
coil drive circuitry coupled to the at least one coil and configured to cause at least one coil to generate the magnetic field;
measurement circuitry operably coupled to the pair of electrodes and configured to provide an indication of the detected electromotive force; and
a processor coupled to the measurement circuitry and the coil drive circuitry, the processor being configured to cause the coil drive circuitry to operate at one of a plurality of coil drive frequencies, the processor also being configured to obtain a plurality of measurement samples while process fluid is flowing and while the coil drive circuitry is operating at a first frequency, the processor being configured to generate an autozero estimate for operation at a second coil drive frequency higher than the first coil drive frequency and save the autozero estimate for use during operation at the second coil drive frequency.

2. The magnetic flowmeter of claim 1, wherein the magnetic flowmeter is a pulsed DC magnetic flowmeter.

3. The magnetic flowmeter of claim 1, wherein the plurality of coil frequencies includes a low frequency and a high frequency and wherein the processor is configured to obtain a plurality of low frequency samples and a plurality of high frequency samples during low frequency operation.

4. The magnetic flowmeter of claim 3, wherein high frequency positive samples are obtained at a portion of a measurement waveform before low frequency positive samples are obtained.

5. The magnetic flowmeter of claim 4, wherein the processor is configured to change timing of the high frequency samples relative to the low frequency samples to determine a maximum coil drive frequency of the magnetic flowmeter.

6. The magnetic flowmeter of claim 4, wherein high frequency negative samples are obtained at a portion of the measurement waveform before low frequency negative samples.

7. The magnetic flowmeter of claim 6, wherein the processor is configured to generate a process fluid output based on the low frequency positive samples and the low frequency negative samples.

8. The magnetic flowmeter of claim 6, wherein the processor is configured to combine high frequency positive samples over a plurality of measurement cycles and to combine high frequency negative samples of the plurality of measurement cycles.

9. The magnetic flowmeter of claim 8, wherein the processor is configured to generate the autozero estimate based on the combined high frequency positive samples, high frequency negative samples, low frequency positive samples, and low frequency negative samples.

10. The magnetic flowmeter of claim 9, wherein the processor is configured to average the high frequency samples over a period of about 90 seconds.

11. The magnetic flowmeter of claim 3, wherein the plurality of high frequency samples is combined over a time period that spans a plurality of measurement cycles.

12. The magnetic flowmeter of claim 1, wherein the processor is configured to generate a process fluid output based on the plurality of measurement samples.

13. The magnetic flowmeter of claim 1, wherein the processor is configured to store a plurality of autozero estimates over time and provide a diagnostic indication based on a change of the autozero estimates over time.

14. The magnetic flowmeter of claim 1, wherein the plurality of coil drive frequencies includes at least three coil drive frequencies.

15. A method of operating a magnetic flowmeter, the method comprising:
    generating an alternating magnetic field in a flowing process fluid using at least one coil of the magnetic flowmeter, the alternating magnetic field having a first frequency;
    obtaining emf measurements from the flowing process fluid while the alternating magnetic field is operating at the first frequency;
    calculating, using a processor of the magnetic flowmeter, an autozero estimation for a second frequency based on the emf measurements obtained while the alternating magnetic field is operating at the first frequency and while the process fluid is flowing; and
    storing the autozero estimation in memory of the magnetic flowmeter.

16. The method of claim 15, and further comprising providing a process fluid output based on the emf measurements.

17. The method of claim 15, and further comprising causing the alternating magnetic field to switch to the second frequency, higher than the first frequency, obtaining a plurality of second frequency emf measurements while the alternating magnetic field is operating at the second frequency, and providing a process fluid output based on the second frequency emf measurements and the stored autozero estimation.

18. The method of claim 17, and further comprising continuously switching between operation at the first frequency and operation at the second frequency.

19. The method of claim 17, and further comprising calculating, using a processor of the magnetic flowmeter, a second autozero estimation for a third frequency based on the emf measurements obtained while the alternating magnetic field is operating at the second frequency and while the process fluid is flowing and storing the second autozero estimation.

20. The method of claim 19, wherein the first frequency is a super-low frequency.

21. The method of claim 20, wherein the first frequency is half of the second frequency.

22. The method of claim 19, and further comprising causing the alternating magnetic field to switch to the third frequency, higher than the second frequency, obtaining a plurality of third frequency emf measurements while the alternating magnetic field is operating at the third frequency, and providing a process fluid output based on the third frequency emf measurements and the stored second autozero estimation.

* * * * *